US005249099A

United States Patent [19]

Sridharan et al.

[11] Patent Number: 5,249,099

[45] Date of Patent: Sep. 28, 1993

[54] STEEL BALLAST ENCLOSURE HAVING INTEGRAL MOUNTING BOSSES AND MOUNTING FLANGES

[75] Inventors: Sri P. Sridharan, Hickory Hills; Frank Jungman, Addison, both of Ill.

[73] Assignee: Radionic Industries, Inc., Chicago, Ill.

[21] Appl. No.: 952,195

[22] Filed: Sep. 29, 1992

Related U.S. Application Data

[63] Continuation of Ser. No. 744,896, Aug. 14, 1991, abandoned, which is a continuation-in-part of Ser. No. 701,049, Aug. 7, 1991, abandoned, which is a continuation of Ser. No. 491,069, Mar. 9, 1990, Pat. No. 5,019,938.

[51] Int. Cl.[5] .......... H02B 1/30

[52] U.S. Cl. .......... 361/674; 361/736; 174/DIG. 2; 220/476

[58] Field of Search .......... 174/DIG. 2; 361/377, 361/331, 380, 392, 395, 417, 419; 220/3.3, 4.02, 476; 72/335, 379.4

[56] References Cited

U.S. PATENT DOCUMENTS

| | | | |
|---|---|---|---|
| 2,850,916 | 9/1958 | Kingdon | 220/3.3 X |
| 2,887,242 | 5/1959 | Grau | 220/4.02 |
| 3,015,682 | 1/1962 | Cheske | 174/DIG. 2 X |
| 3,250,956 | 5/1966 | Lovinger . | |
| 3,360,687 | 12/1967 | Riesland | 361/377 |
| 3,365,926 | 1/1968 | Price | 72/335 X |
| 3,673,310 | 6/1972 | Welsh . | |
| 3,778,529 | 12/1973 | Miller . | |
| 3,851,225 | 11/1974 | Luchetta | 361/377 |
| 3,868,080 | 2/1975 | Olson . | |
| 4,632,642 | 12/1986 | Meister, III et al. . | |
| 4,712,157 | 12/1987 | Simonson et al. . | |
| 4,719,540 | 1/1988 | San George et al. . | |
| 4,739,188 | 4/1988 | DeCandia et al. . | |
| 4,766,406 | 8/1988 | Kurgan et al. . | |
| 4,897,627 | 1/1990 | Van Wagener et al. . | |
| 4,916,363 | 4/1990 | Burton et al. | 361/377 X |
| 5,023,521 | 6/1991 | Sridharan et al. . | |

*Primary Examiner*—Leo P. Picard
*Assistant Examiner*—Michael W. Phillips
*Attorney, Agent, or Firm*—Hill, Steadman & Simpson

[57] ABSTRACT

A ballast enclosure made of metal and including a rectangular enclosure body having mounting bosses integrally formed in the side walls thereof. Preferably, the bosses are formed by stamping the bosses into the sidewalls and are so constructed and arranged that they can receive self-tapping screws to attach the enclosure to an adjoining wall. Mounting flanges are also provided.

10 Claims, 1 Drawing Sheet

FIG. 1
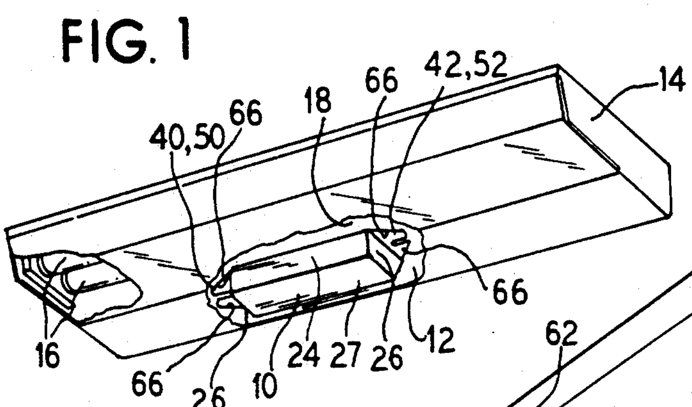
FIG. 2
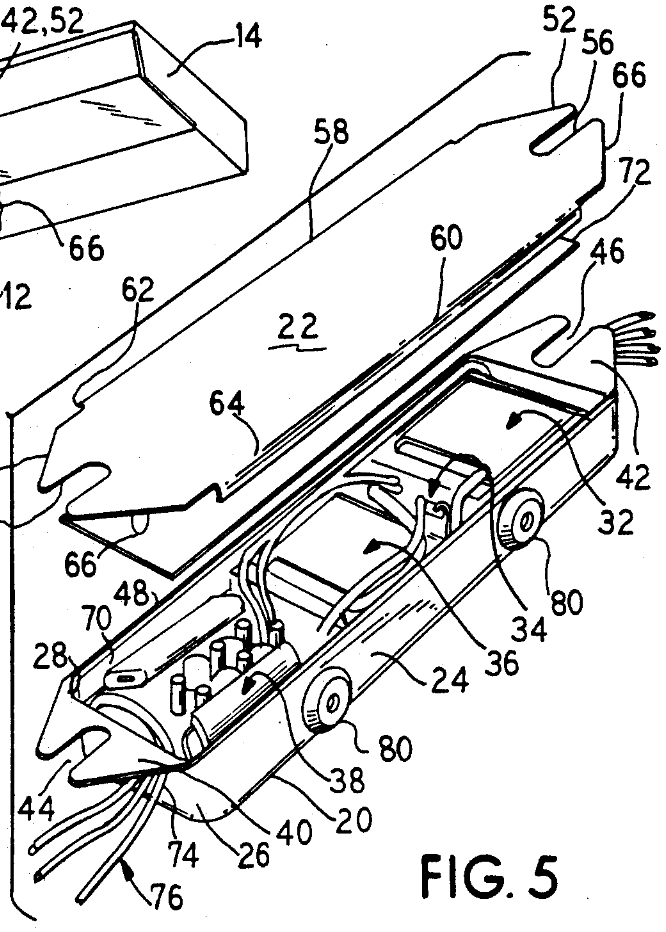
FIG. 5
FIG. 3
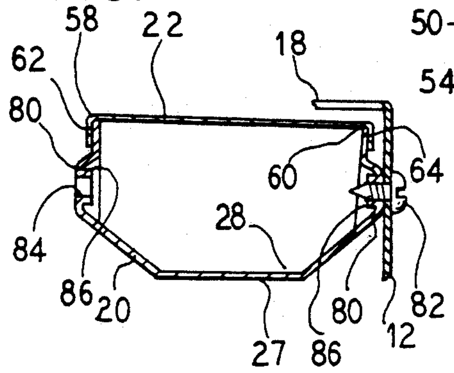
FIG. 4
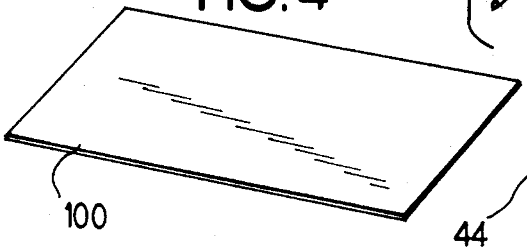
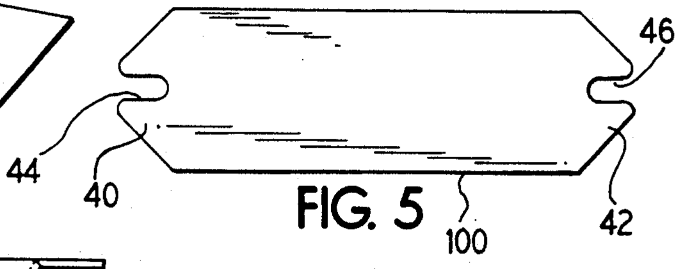
FIG. 5
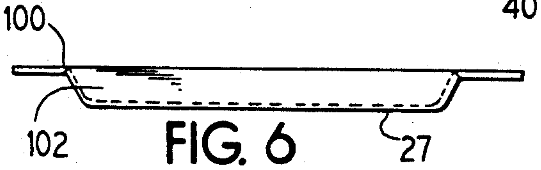
FIG. 6
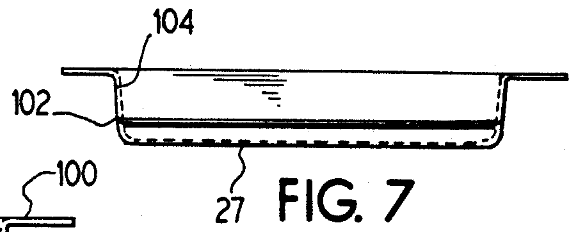
FIG. 7
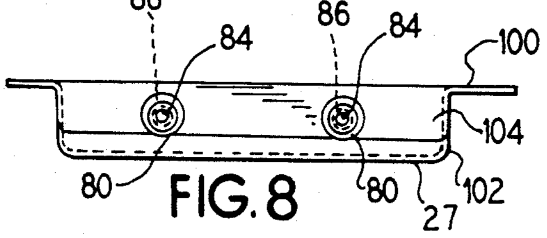
FIG. 8

STEEL BALLAST ENCLOSURE HAVING INTEGRAL MOUNTING BOSSES AND MOUNTING FLANGES

RELATED APPLICATIONS

This is a continuation of application Ser. No. 744,896, filed Aug. 14, 1991 abandoned, which is a continuation-in-part of U.S. patent application Ser. No. 701,049, filed Aug. 7, 1991, abandoned, which is fully incorporated herein by reference. Ser. No. 701,049 is a continuation of U.S. patent application Ser. No. 491,069, filed Mar. 9, 1990, now allowed as U.S. Pat. No. 5,019,938, also fully incorporated herein by reference.

BACKGROUND OF THE INVENTION

The present invention generally relates to ballast enclosures for, for example, fluorescent lamp fixtures.

Heretofore, ballast enclosures were attached to lighting fixtures and the like by means of spacer members attached to the enclosures. Generally, the spacer members comprise flanges that are integrally formed with the enclosure. Self-tapping screws or bolts are then inserted through the wall of the fixture or the like and then received within a suitable hole formed in the flange member.

The foregoing constructions, however, are relatively costly to manufacture and assemble. The use of the spacer requires an extra manufacturing step to form the spacer. Additionally, the spacers generally space the enclosures an unacceptable distance from the wall thereby using up too much space within a lamp fixture.

SUMMARY OF THE INVENTION

The present invention provides a compact enclosure for a ballast that is more simply manufactured and assembled. In this construction, the use of a spacer is eliminated.

To this end, the present invention provides a metal enclosure for a ballast in which are integrally formed bosses for self-tapping screws. These bosses provide for a simple and quick attachment of the enclosure to a wall.

In an embodiment, the invention provides that the enclosure is formed by several stamping steps out of an initially flat piece of metal. As a result, the enclosure is sturdy and metallic to thereby contain therein magnetic flux fields.

These and other features of the invention will become clear with reference to the accompanying detailed description of the presently preferred embodiments and accompanying drawings.

BRIEF DESCRIPTION OF THE DRAWINGS

FIG. 1 illustrates in perspective view a lighting fixture with a ballast enclosure affixed thereto.

FIG. 2 illustrates an exploded view of the assembly of a ballast enclosure.

FIG. 3 illustrates in sectional view a ballast enclosure including bosses.

FIGS. 4–8 illustrate the method by which the ballast enclosure of FIGS. 1–3 is formed.

DETAILED DESCRIPTION OF THE PRESENTLY PREFERRED EMBODIMENT

In accordance with the invention, a ballast enclosure is formed of metal, preferably steel, and includes integrally formed therewith bosses for mounting of the enclosure to a wall. Such an enclosure is illustrated in FIGS. 1–3. The method by which such an enclosure is formed is illustrated in FIGS. 4–8.

In FIG. 1, it can be seen that a ballast enclosure 10 is affixed to a side wall 12 of a fluorescent lamp fixture 14. The fixture 14 is structured to receive therein two or more fluorescent lightbulbs 16. The enclosure 10 is affixed to the side wall 12, but alternatively it could also be affixed to a ceiling 18 in a manner to be described below.

In FIGS. 2 and 3, the enclosure 10 is illustrated in greater detail. As illustrated, the enclosure 10 comprises two components: a body 20 and a lid or cover 22. The body 20 is constructed to be a box that is substantially rectangular in shape with two elongated lateral or side walls 24, two longitudinal end walls 26, and a floor 27. The enclosure body 20 thus includes a cavity 28 within which is accepted ballast circuitry, such as that disclosed in U.S. Pat. No. 5,023,521, fully incorporated herein by reference.

The ballast circuitry as illustrated, is received such that the following sections are provided preferably in the following order: a first transformer section 32, a thermal protection section 34, a second transformer section 36, and a printed circuitboard section 38.

As also illustrated, the enclosure body 20 includes two substantially triangular alternative mounting flanges 40 and 42 disposed at the longitudinal ends 26 thereof, these flanges 40 and 42 including recesses 44 and 46, respectively formed in the apexes thereof to receive therein the shaft of a bolt or screw.

With respect to the lid 22, it can be seen that the lid 22 corresponds substantially in shape to the outer periphery of the top edge 48 of the enclosure body 20. To this end, the enclosure lid 22 is substantially flat or planar and includes opposite projecting triangular ends 50 and 52, the peripheries of which correspond in shape to the triangular flanges 40 and 42, respectively. These triangular ends 50 and 52 also include recesses 54 and 56, respectively in the apexes of their triangular areas to accommodate therein the shaft of a bolt or screw.

Disposed along opposite lateral edges 58 and 60 of the lid 22, are two downwardly depending flanges 62 and 64, respectively that engage against the outside of the lateral walls 24 of the enclosure body 20. It can be appreciated that these flanges 62 and 64 assist in the positioning of the lid 22 on the body 20 and serve to retain the lid 22 on the body 20.

The lid 22 is also provided with four folding tabs 66 operatively positioned about the outer peripheries of the ends 50 and 52 so that when the lid 22 is placed in registry with the body 20, the tab 66 can be folded beneath the flanges 40 and 42 thereby to secure the lid 22 onto the body 20. It can be appreciated that in this manner, the lid 22 can be readily secured to the body 20 without the use of screws, bolts, or the like. One simply perhaps needs a pair of pliers to effect such folding of the tabs 66.

It can be appreciated that since the enclosure is metallic, it is necessary to protect against contact between any exposed conductive part of the ballast circuitry 30 and the enclosure 10. To that end, there is included a suitable insulator 70 sheet that surrounds the ballast circuitry 30 and conforms substantially in shape to the cavity 28 within the enclosure body 20.

Additionally, there is provided a rectangular insulator sheet 72 disposed between the lid 22 and the top side of the ballast circuit. The insulator 70 can be made of, for example, insulation paper while the insulator 72 can be made of a plastic such as polyester. Suitable openings 74 are provided at the opposite longitudinal end walls 26 of the enclosure body 20 through which exterior connecting wires 76 of the ballast circuitry 30 extend.

During the formation of the enclosure body 20, it can be seen that there are provided a variety of bosses 80 operative to receive therein self-tapping screws 82. These bosses 80 extend slightly outwardly from the side walls 24 of the enclosure body 20 by a sufficient distance so that a screw 82 extending therethrough to secure the enclosure 10 to a wall 12 will not puncture through the insulator 70 surrounding the ballast circuitry. It can also be seen that each boss 80 is provided with a central opening 84 and an inwardly extending annular thread seat 86 onto which the threads of the screw 82 can engage.

It can be appreciated that due to the metallic construction of the enclosure 10, magnetic fluxes are retained within a closed electrical circuit provided by the enclosure 10. As a result, this enclosure 10 prevents the generation of hum created by the alternating magnetic flux fields generated in turn by the ballast circuitry 30. Because of the reduction in hum, the enclosure 10 thus provides for a quiet ballast for a lamp fixture.

It can be appreciated that, should, for some reason, the bosses 80 be unusable,.then the enclosure 10 can be mounted to the ceiling or wall of a fixture via the mounting flanges 40 and 42. Further, the enclosure 10 can be secured via both the bosses 70 and the flanges 40 and 42.

In FIGS. 4–8, the method by which such an enclosure 10 is manufactured is provided. As illustrated in FIG. 4, a suitably sized rectangular piece of metal 100 is selected for the process. This rectangular metal piece 100 is cut to the shape of the upper outer periphery of the enclosure as illustrated in FIG. 5. To this end, the rectangular plate is provided with cuts to produce the triangulated longitudinal flanges 40 and 42 of the enclosure body 20 with their associated recesses 44 and 46. Then, as illustrated in FIG. 6, a first stamping is provided to provide a first cavity 102 defining the floor 27. Subsequently, in a second stamping step, the bottom of this cavity 102 is again stamped with a wider anvil to provide a wider upper cavity 104 and to provide a substantially bowed or rounded bottom surface to the enclosure body 20. Finally, as illustrated in FIG. 8, the bosses 80 in the side walls 26 and 28 are stamped. The stamping of the bosses 80 can be provided in two steps, one step for each side wall.

While a preferred embodiment has been shown, modifications and changes may become apparent to those skilled in the art which shall fall within the spirit and scope of the invention. It is intended that such modifications and changes be covered by the attached claims.

What is claimed is:

1. A ballast circuit enclosure, comprising:

a substantially rectangular conductive metallic enclosure body having a floor and four upstanding walls formed from a sheet of metal;

a conductive metallic lid removably connected for covering the upstanding walls to close the body, said lid and said body including matching flanges positioned on opposite longitudinal ends for mounting of said enclosure to a surface; and at least one wall having at least one portion deformed to project outwardly therefrom to form a pair of unitarily formed bosses in at least one of the upstanding walls of the body, the bosses being configured to receive self-tapping fastening means for effecting an attachment of the enclosure to an adjoining support surface, each boss having an opening with a thread seat onto which threads of the self-tapping fastening means can engage.

2. The enclosure of claim 1, wherein the lid and enclosure body are made of steel.

3. The enclosure of claim 1, wherein the flanges are substantially triangular in shape and include recesses positioned at right angles through apexes thereof.

4. The enclosure of claim 1, wherein the lid includes two downwardly depending flanges which overlap opposite lateral edges of the enclosure body, the downwardly depending flanges grasping outside of the upstanding walls of the enclosure body.

5. A ballast circuit enclose, comprising:

a substantially rectangular metallic box make of a sheet of metal, said box having a floor, upstanding longitudinal end walls, and upstanding lateral walls;

a metallic cover removably connected for covering said box, said cover and said box including matching flanges positioned on opposite longitudinal ends for mounting of said enclosure to a surface; and unitarily formed bosses in said lateral walls for mounting of said enclosure to a wall, at least one lateral wall having at least a portion thereof deformed to project outwardly therefrom to form a pair of bosses configured to receive a screw therein, each boss having an opening with a thread seat configured to engage threads of the screw.

6. The enclosure of claim 5, wherein said cover and box are made of steel.

7. The enclosure of claim 5, wherein said bosses include centrally disposed openings and an inwardly projecting thread seat.

8. The enclosure of claim 5, further including insulation means for electrically insulating components contained therein from said enclosure.

9. The enclosure of claim 5, further including conductor access openings disposed in said longitudinal end walls.

10. A ballast circuit enclosure comprising:

a substantially rectangular metallic box made of a sheet of metal having a floor and four upstanding walls;

a metallic lid removably connected to cover said box, said lid and said box including matching flanges positioned on opposite longitudinal ends for mounting of said enclosure to a surface;

unitarily formed mounting bosses in at least one of said upstanding walls, said bosses including openings and annular screw thread seats at least one upstanding wall having at least one portion thereof deformed to project outwardly therefrom to form a pair of bosses configured to receive screws therein, each boss having an opening with an inwardly extending annular thread seat configured to engage threads of a screw; and unitarily formed mounting flanges on opposite ends of said box.

* * * * *